United States Patent [19]

Rey

[11] Patent Number: 5,699,862
[45] Date of Patent: Dec. 23, 1997

[54] FOAM GENERATING DEVICE FOR FIRE-FIGHTING HELICOPTER

[76] Inventor: Claude Rey, Impasse des Fenières, F-84120 La Bastidonne, France

[21] Appl. No.: 681,384

[22] Filed: Jul. 23, 1996

[30] Foreign Application Priority Data

Jun. 6, 1994 [FR] France .................. 94 07098

[51] Int. Cl.⁶ .................................................. B64D 1/18
[52] U.S. Cl. .................. 169/53; 169/15; 244/136
[58] Field of Search .................. 169/15, 53; 244/136

[56] References Cited

U.S. PATENT DOCUMENTS

| | | |
|---|---|---|
| 3,428,131 | 2/1969 | Winslow . |
| 3,442,334 | 5/1969 | Gousetis . |
| 3,580,339 | 5/1971 | Nance . |
| 3,936,018 | 2/1976 | Barlow . |

FOREIGN PATENT DOCUMENTS

| | | |
|---|---|---|
| 32 09 354 | 9/1983 | Germany . |
| 2 141 912 | 1/1985 | United Kingdom . |
| 91/14477 | 10/1991 | WIPO . |

*Primary Examiner*—Gary C. Hoge
*Attorney, Agent, or Firm*—Oliff & Berridge

[57] ABSTRACT

A helicopter (20) is equipped with a foam generating device (22) comprising a tank (1) associated with a pump system (2) and a mixer device (36) to deliver a mixture water-emulsifier. A spraying system (44) comprises two modules (44a, 44b) arranged on the side faces outside the helicopter (20), each module comprising a frame (3) mounted pivotally around and axis (6) between an upward inactive position and a lowered active position, and a network (4) linked with the exhaust pipe of the mixer device (36). The network (4) is placed under the blades (46) of the helicopter (20), and is constituted by a pattern of squares equipped with a multitude of sprinklers (5) which can spray the mixture water-emulsifier over the tight-mesh net (11) to produce foam under the action of the pressurized air generated by the blades (46). The moving of the modules (44a, 44b) between the two lifted and lowered positions is ensured by a lifting device (9) with hydraulic or electric control.

8 Claims, 4 Drawing Sheets

FOAM GENERATING DEVICE FOR FIRE-FIGHTING HELICOPTER

BACKGROUND OF THE INVENTION

The invention relates to a helicopter for fire-fighting, provided with a foam generating device and comprising first means for mixing water with a chemical emulsion product or emulsifier under pressure, and second air-pressurized means to create expanding foam from the water-emulsifier mixture, and for projecting said foam on the site on fire.

The usual way to create foam is to use a device injecting a mixture of water and emulsifier over a grid, the air being provided by a fan or an air compressor. The use of a special fan or an air compressor complicates the installation of the foam generating device and increases its weight as well as the production and running costs.

SUMMARY OF THE INVENTION

The purpose of the invention is to design a foam generating device for helicopter in which the foam production and projection operations are improved.

The foam generating device is characterized in that:

first means are arranged inside the helicopter and comprise a tank associated with a pump and pressure making system and with a mixer to deliver the mixture of water and emulsifier, second means comprise a projection system with two base modules arranged on the side faces outside the helicopter, each module comprising a frame mounted pivotally around an axis between an upward inactive position and a lowered active position, and a network linked with the output pipe of the mixer, the network is located under the blades of the helicopter and is designed according to a grid equipped with sprinklers, which can spray the mixture of water and emulsifier over a flexible net of tightly knit synthetic material in order to produce the foam by the pressurized air generated by blades, and a hydraulic or electric actuated lifting device that ensures the moving of the modules between the two upward and lowered positions.

The blades of the helicopter act advantageously as a fan, which helps the foam expand through the net. The pressurized air below the blades also allows efficient foam coating covering zone requiring protection such as inflammable liquids, incandescent vegetation or vegetation not yet on fire to slow down the progression of the fire.

According to another characteristic of the invention, the net of flexible synthetic fibers is hung under the frame by a second fastening device with cables. The net is surrounded by a flexible but weighted sheet, which is attached to the frame by split fastening rings, in order to constitute a guide to deliver a uniform foam projection.

BRIEF DESCRIPTION OF THE DRAWINGS

Other advantages and characteristics will become more clearly apparent from the following detailed description of an embodiment of the invention which refers to the accompanying drawings given for example purposes only and in which.

DETAILED DESCRIPTION OF THE PREFERRED EMBODIMENT

Figure 1:
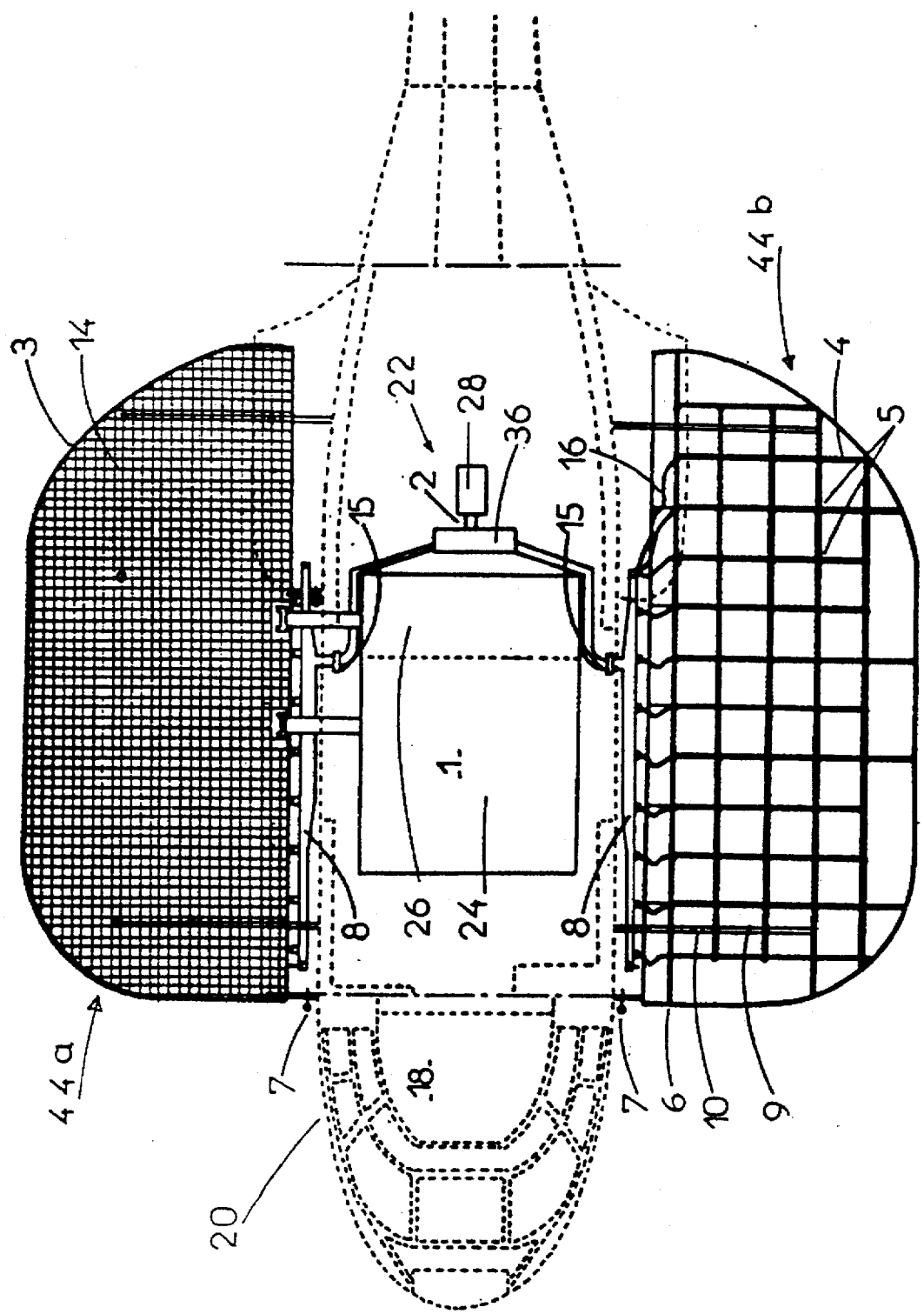
FIG. 1 is a bottom view of the helicopter equipped with the foam generating device according to the invention, the upper half-view showing the frame, and the lower half-view showing the network of the projection system.
Figure 2:
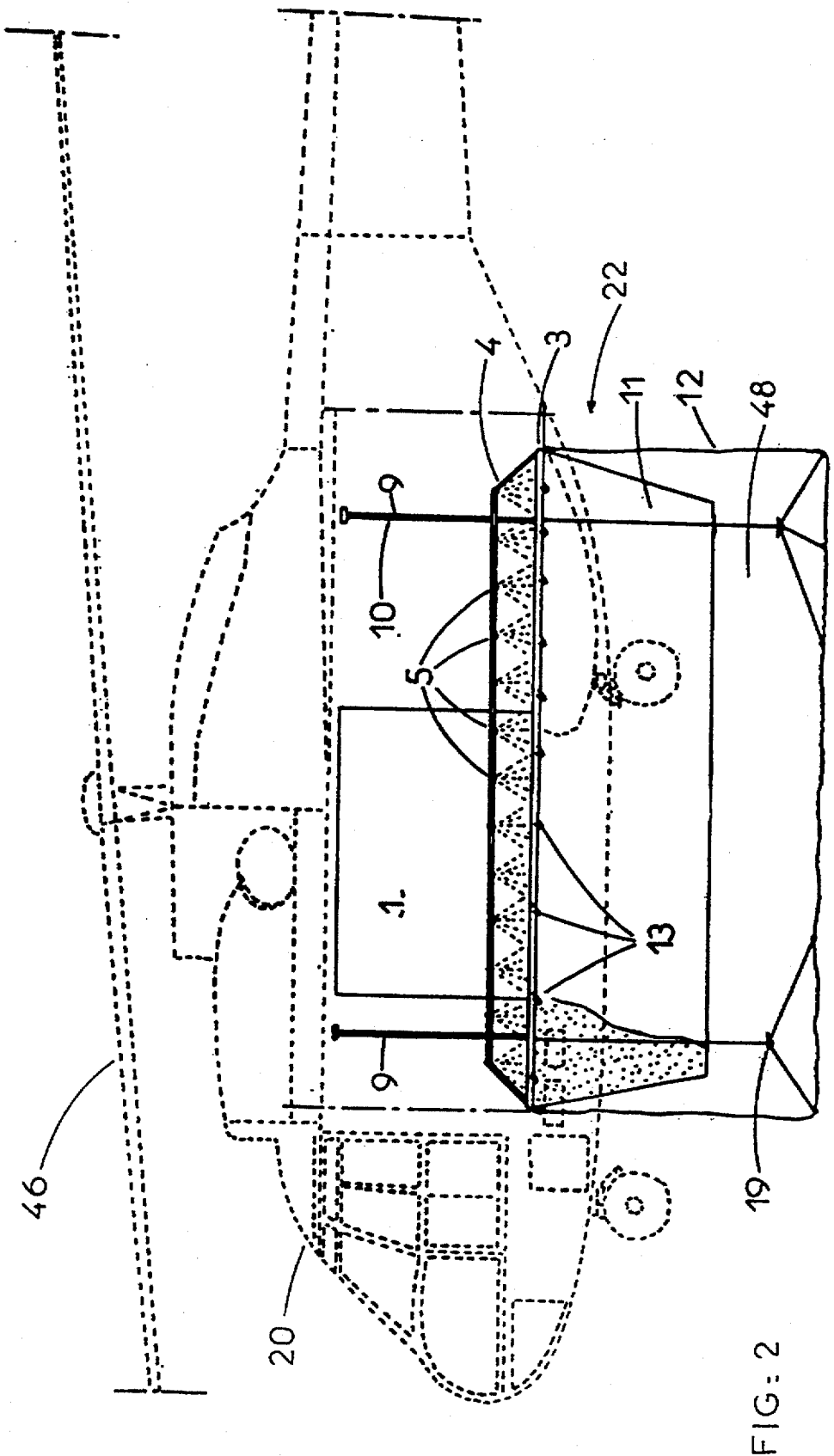
FIG. 2 is a side view of FIG. 1.

With reference to FIGS. 1 to 4, a helicopter 20 is equipped with a foam generating device 22, used especially to fight forest or other fires.

The foam generating device 22 comprises a rigid tank 1 and a pump system 2, both arranged inside the helicopter 20. The tank 1 is divided into two adjacent compartments, constituted by a first compartment 24 for the filling with water, and a second compartment 26 containing a chemical emulsifier or short-term fire retardant. Each compartment 24, 26 is filled up via a pipe having an admission connector fitted with a one-way valve. The volume of tank 1 and its position and footing parameters are determined by the helicopter manufacturer as well as partitioning of the transport type.

Figure 4:
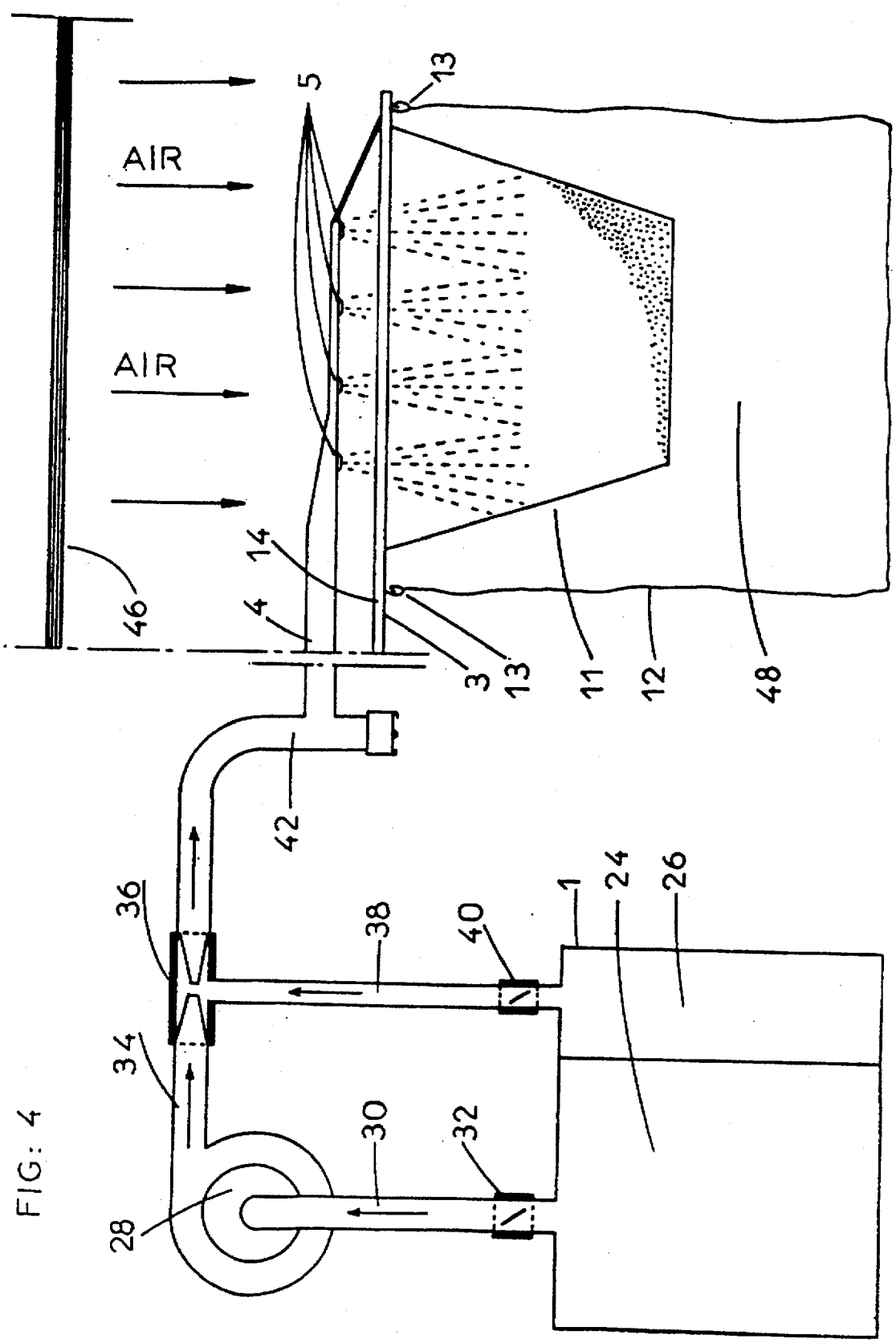
FIG. 4 is a schematic view of the foam generating device of FIG. 1.

The pump system, as shown in detail in FIG. 4, is provided with a pump 28 with an admission pipe 30 connected to the first compartment 24 by a first control tap 32, and an output pipe 34 connected to a mixer device 36. The second compartment 26 is connected to the mixer 36 by another pipe 38 fitted with a second control tap 40, which allows to control the quantity of the emulsifier. The different components of the pump system 2 can be activated by either electric, pneumatic or hydraulic control means. The mixer 36 produces the mixture of water and emulsifier, which is pushed through two exhaust pipes 42.

Figure 3:
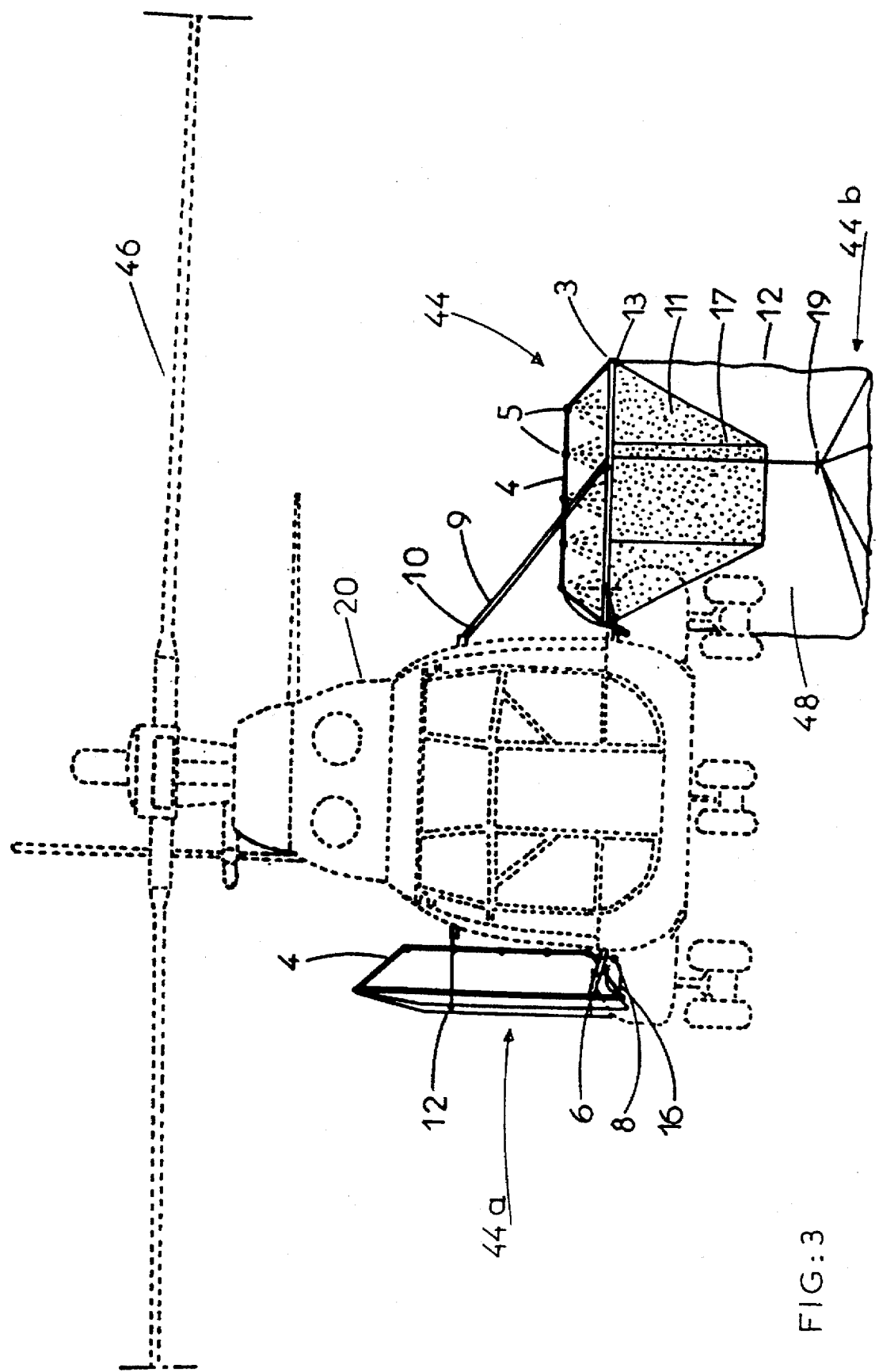
FIG. 3 is a frontal view of the helicopter, the left half-view showing the helicopter in motion with the projection module in the upward position, and the right half-view showing the helicopter during the foam spraying in the lower position of the module.

The foam generating device 22 comprises also a spraying system 44 arranged on the opposite side faces outside the cabin of the helicopter 20. The spraying system 44 is provided with two base modules 44a, 44b, of identical structure, and arranged symmetrically to the median plane. Each module 44a, 44b comprises a frame 3 of light but strong metal, mounted pivotally on an axis 6 between an upward inactive position (FIG. 3, left half-view), and a lower active position (FIG. 3, right half-view). The axis 6 extends parallelly to the median longitudinal plane, and allows to fold the module 44a, 44b against the cabin of the helicopter in order to reduce the flight parameters when the helicopter is in transit.

A wide-mesh grid 14 is fixed to the frame 3, and above the grid 14 is situated a network 4 comprising derivation tubings connected with a single feed-ramp 8, which is linked to the corresponding exhaust pipe 42. The derivation tubings of the network 4 form a pattern of squares (FIG. 1), and at each intersection a calibrated sprinkler 5 is attached to spray the water-emulsifier mixture at a 45° angle. The distance separating the network 4 and the lower grid 14 is approximately 300 mm. A fast connector 15 allows to fix the exhaust pipe 42 to the feed-ramp 8 to facilitate the disconnection of the spraying system 44.

The frame 3 is fixed to the body of the helicopter 20 by a first fastening cable device 10, the length of the cables 10 being adjusted to a predetermined value, allowing to maintain each module 44a, 44b in the lowered active position, in which the frame 3 extends orthogonally to the median plane through the axis of the rotor.

The network 4 is connected to the rigid feed-ramp 8 by flexible pipes 16 to allow folding of the modules 44a, 44b, towards the upward position. The spraying system 44 is fixed to the cabin of the helicopter by assembling means 7 allowing the fast assembling and disassembling of the modules 44a, 44b.

A flexible net 11, made of synthetic fibers, is attached to the frame 3 by a second fastening cable device 17, and comprises a tight-mesh structure which can generate a multitude of bubbles resulting from the action of the pressurized air on the mixture of water and emulsifier coming from sprinklers 5.

The pressurized air is provided by the blades 46 of the helicopter acting as a fan in order to push the water-emulsifier mixture through the net 11 for expanding the foam in the area of projection 48. The net 11 is surrounded by a flexible sheet 12 made of polyethylene, fixed to the frame 3 by fastening split rings 13, facilitating the removal of the sheet 12 in case of accident. The expanding of the foam can be variable and is function of the nature and quantity of the emulsifier.

The presence of the sheet 12 surrounding the net 11 constitutes a guide to produce a uniform and precise foam projection, avoiding a too wide spread. The lower part of the sheet 12 can be weighted, and a lifting device of cables 9 is fitted with a lock-ring 19 to raise successively the net 11, the frame 3 and the network 4.

A winch (not drawn) is connected to the lifting device of cables 9 in order to ensure the lowering and raising operations of the elements constituting each module 44a, 44b. The winch can be activated by hydraulic or electric means, and may be coupled with a manually activated safety mechanism.

The lifting device of cables 9 cooperates with security means which break the mechanical link in order to drop the sheet 12 and the cable in case of an accident. The security means can be realized by pins calibrated to break or by any equivalent mechanical system.

All controls, particularly of the lifting device of cables 9, the pump activating system 2, the regulating of the second tap 40 for the emulsifier, are connected to the dashboard 18 according to the specifications of the helicopter manufacturer.

The chemical emulsifier product contained in the second compartment 26 of tank 1 is a liquid with a short-term fire retardant, sold under various name brands, such as FIRE-TROL, FIRE-FOAM 103 manufactured by CHEMONICS INDUSTRIES INC., or POLYTROL manufactured by BIOGENA.

It is also possible to use an emulsifier, in form of a powder with a long term fire retardant. Each other product may be used, of course, determined by the mission attributed to the helicopter.

The functioning of the foam generating device 22 is as follows:

During the transit phase, the tank 1 of the helicopter 20 is filled with water and a specific emulsifier according to the nature and location of the fire. The two modules 44a, 44b of the spraying system 44 are folded in the upward position (FIG. 3, left) so that the helicopter 20 is not impeded in its speed. The sheet 12 can be fixed by straps to avoid flapping.

Once the helicopter 20 has reached the fire zone, the crew removes the straps and controls the unfolding of the modules 44a, 44b when lowering the lifting device of cables 9. The activating movement drives first the frame 3 and the network 4 until the first fastening cable device 10 retains them in the lower position. Then the net 11 and the sheet 12 are unfolded downwards until the final position (FIG. 3, right).

The activating of the pump system 2 after the dose adjustment of the emulsifier allows then to treat the fire zone. The treatment of this zone will be determined by the characteristics of the ground and the density of the vegetation. The foam spraying by helicopter will coat the zone requiring protection with foam in order to slow down the progression of the fire. The foam will be fixed best to the different parts of the zone thanks to the air pressure under the blades 46 of the helicopter 20.

Once the tank 1 is empty, the pump system 2 is turned off and the modules 44a, 44b are lifted back to the upward position by the lifting system of cables 9. The helicopter can then fly back to the base to refill the tank with water and emulsifier.

When the two compartments 24, 26 of the tank 1 are full, the helicopter 20 is again operational.

It is clear that the lifting system with cables 9 could be replaced by a push-rod mechanism or by any other mechanical or hydraulic transmission system.

I claim:

1. A helicopter for fire-fighting, provided with a foam generating device, comprising:

first means for mixing water with a chemical emulsion product or emulsifier under pressure; and second air-pressurized means for creating expanding foam from the water-emulsifier mixture and for projecting said foam on a site on fire, wherein said first means are arranged inside the helicopter and include a tank associated with a pump system and a mixer to deliver the mixture of water and emulsifier, said second means include a projection system with two base modules arranged on side faces outside the helicopter, each said module having a frame mounted pivotally around an axis between an upward inactive position and a lowered active position; a network linked with an outlet pipe of the mixer, the network located under blades of the helicopter and including a grid equipped with a multitude of sprinklers which can spray the mixture of water and emulsifier over a net of tightly knit synthetic material so as to produce the foam by pressurized air generated by the blades; and a lifting device of cables attached to the modules that moves the modules between the upward inactive position and the lowered active position.

2. The helicopter according to claim 1, wherein the frame of each module is fixed to a body of the helicopter by a first fastening device of cables arranged to maintain each module in the active lowered position, in which the frame extends substantially orthogonally to a median plane passing through an axis of a helicopter rotor activating the blades.

3. The helicopter according to claim 1, wherein the net of flexible synthetic material is hung under the frame by a second fastening device of cables.

4. The helicopter according to claim 3, wherein the net is surrounded by a flexible and weighted sheet fixed to the frame by fastening rings forming a guide for the delivery of the foam.

5. The helicopter according to claim 1, wherein tubings of the frame are connected with a rigid feed-ramp by flexible pipes, allowing the folding of the modules towards the upward position.

6. The helicopter according to claim 4, wherein the lifting device is arranged for generating successive lowering of the frame and network, and then of the net and sheet upon unfolding movement of each module toward the active lowered position.

7. The helicopter according to claim 6, wherein the lifting device is associated with a lock-ring to raise successively the sheet, the net, the frame, and the network and to apply each said module against the helicopter in said upward inactive position.

8. The helicopter according to claim 1, wherein the projection system is fixed to the helicopter by assembling means allowing the fast assembling and disassembling of the modules.

* * * * *

UNITED STATES PATENT AND TRADEMARK OFFICE
CERTIFICATE OF CORRECTION

PATENT NO. : 5,699,862

DATED : December 23, 1997

INVENTOR(S) : Claude REY

It is certified that error appears in the above-indentified patent and that said Letters Patent is hereby corrected as shown below:

On the title page, item [56], add the following:

```
              U.S. PATENT DOCUMENTS
   --4,979,571    12/1990    MacDonald--
   --3,714,987    02/1973    Mattson--
   --5,385,208    01/1995    Baker et al.--

FOREIGN PATENT DOCUMENTS
   --258,039      11/1970    Soviet Union--

--OTHER PUBLICATIONS
John Nagy et al., "Controlling Mine Fires With High-Expansion Foam,"
United States Department of the Interior, Bureau of Mines, Report
of Investigations 5632. See Fig. 16. 07/1967.--
```

Signed and Sealed this

Seventeenth Day of March, 1998

*Attest:*

BRUCE LEHMAN

*Attesting Officer*  *Commissioner of Patents and Trademarks*